(12) United States Patent
Matter et al.

(10) Patent No.: US 9,045,623 B2
(45) Date of Patent: Jun. 2, 2015

(54) METHOD FOR PRODUCING BN-BASED NANOPARTICLES AND PRODUCTS THEREFROM

(71) Applicants: Paul H. Matter, Columbus, OH (US); Christopher T. Holt, Bexley, OH (US); Michael G. Beachy, Gahanna, OH (US)

(72) Inventors: Paul H. Matter, Columbus, OH (US); Christopher T. Holt, Bexley, OH (US); Michael G. Beachy, Gahanna, OH (US)

(73) Assignee: PH MATTER, LLC, Columbus, OH (US)

( * ) Notice: Subject to any disclaimer, the term of this patent is extended or adjusted under 35 U.S.C. 154(b) by 106 days.

(21) Appl. No.: 13/648,660

(22) Filed: Oct. 10, 2012

(65) Prior Publication Data

US 2013/0087071 A1    Apr. 11, 2013

Related U.S. Application Data (60) Provisional application No. 61/545,726, filed on Oct. 11, 2011.

(51) Int. Cl.
| | |
|---|---|
| *C01B 21/064* | (2006.01) |
| *C09D 101/02* | (2006.01) |
| *B01F 3/12* | (2006.01) |
| *C08K 3/38* | (2006.01) |
| *B82Y 30/00* | (2011.01) |
| *C08L 1/18* | (2006.01) |
| *B82Y 40/00* | (2011.01) |

(52) U.S. Cl.
CPC . *C08K 3/38* (2013.01); *B82Y 30/00* (2013.01); *B82Y 40/00* (2013.01); *C08L 1/18* (2013.01); *C01B 21/0646* (2013.01); *C01P 2002/72* (2013.01); *C01P 2002/76* (2013.01); *C01P 2002/85* (2013.01); *C01P 2004/03* (2013.01); *C01P 2004/62* (2013.01); *C01P 2004/64* (2013.01)

(58) Field of Classification Search
None
See application file for complete search history.

(56) References Cited

U.S. PATENT DOCUMENTS

| | | | |
|---|---|---|---|
| 6,306,358 B1 | 10/2001 | Yamamoto | |
| 6,348,179 B1 * | 2/2002 | Paine et al. | 423/277 |

(Continued)

OTHER PUBLICATIONS

"Large Scale Growth and Characterization of Atomic Hexagonal Boron Nitride Layers" Li Song et al. Nano Letters, vol. 10, pp. 3209-3215, 2010.*

(Continued)

*Primary Examiner* — Melvin C Mayes
*Assistant Examiner* — Douglas Call
(74) *Attorney, Agent, or Firm* — Michael J. Gallagher; David J. Dawsey; Gallagher & Dawsey Co., LPA (57) ABSTRACT

A method of forming boron nitride nanoparticles. A plurality of precursor molecules comprising boron, nitrogen and hydrogen may be decomposed in a first heating zone to form a plurality of gaseous molecules that contain bonded boron and nitrogen, followed by heating to a second, higher temperature thereby causing the gaseous molecules to react and nucleate to form a plurality of boron nitride nanoparticles. Depending on processing temperatures, the boron nitride nanoparticles may include amorphous forms, crystalline forms, or combinations thereof. Precursor molecules may include ammonia borane, borazine, cycloborazanes, polyaminoborane, polyiminoborane, and mixtures thereof. The boron nitride nanoparticles may be incorporated into a variety of dispersions, composites, and coatings; and in one embodiment, may be a component of a propellant, wherein the boron nitride nanoparticles may confer a range of advantages to gun barrels in which such propellants may be fired.

11 Claims, 6 Drawing Sheets

(56) References Cited

U.S. PATENT DOCUMENTS 6,576,598 B2 6/2003 Brown
6,824,753 B2 * 11/2004 Paine et al. ............ 423/277

OTHER PUBLICATIONS

"Synthetic Routes and Formation Mechanisms of Spherical Boron Nitride Nanoparticles" Advanced Functional Materials, vol. 18, pp. 3653-3661, 2008 Chengchun Tang, et al.*

Pakdel et al., "Low-dimensional boron nitride nanomaterials", Materials Today, vol. 15, No. 6, Jun. 2012, p. 256-265.

P. Veeraraghavan Ramachandran and Pravin D. Gagare, "Preparation of Ammonia Borane in High Yield and Purity, Methanolysis, and Regeneration", Inorg. Chem. 2007, 46, 7810-7817.

Richard G. Hasanbein, "Wear and Erosion in Large Caliber Gun Barrels", unclassified report from Benet Laboratories, Jun. 2004.

* cited by examiner

METHOD FOR PRODUCING BN-BASED NANOPARTICLES AND PRODUCTS THEREFROM

CROSS-REFERENCE TO RELATED APPLICATIONS

This application claims the benefit of U.S. Provisional Patent Application 61/545,726; filed Oct. 11, 2011.

STATEMENT REGARDING FEDERALLY SPONSORED RESEARCH OR DEVELOPMENT

This invention was made with government support under contract number W15QKN11C0021 awarded by the United States Department of the Army. The government has certain rights in the invention.

TECHNICAL FIELD

The present disclosure relates generally a method for making boron nitride nanoparticles, and associated dispersions, composites and coatings, and particularly for forming and using boron nitride nanoparticles as a constituent of such dispersions, composites and coatings.

BACKGROUND OF THE INVENTION

High temperatures, pressures and corrosive chemical environments are all known to cause advanced wear and erosion of metals. While the present invention is directed in part to the general filed of chemical dispersions and coatings, in one particular application, the repeated high temperatures, pressures and chemical environments found in the interiors of gun barrels cause wear on these gun barrels, and eventually contribute to the limited usable lifetimes of such.

When a gun is fired the propellant generates temperatures as high as 2200° C. to 3500° C. and pressures between 20,000 and 80,000 psi. These extreme conditions lead to wear of gun barrels via mechanisms including mechanical stress from the heat and pressure, chemical interaction of the barrel with combustion gases, and abrasion from unburnt particles. This wear leads to enlargement of the muzzle bore or damage to its surface, which reduces muzzle velocity, range, and accuracy. Consequently, firearm lifetime is limited by barrel erosion, and the adoption of more powerful propellants cannot be realized because of the unreasonably low durability caused by advanced propellants. Further, the use of propellants that are stoichiometrically balanced would eliminate secondary muzzle flash and the associated signature of this phenomenon. However, the high temperatures produced by fuel and oxidant balanced propellants would erode the barrel very quickly, thus preventing their practical use.

Propellant additives can be used to reduce gun barrel wear and could permit the use of higher performance propellants. For example, small amounts of ceramic oxides (usually 1% or less), such as titania and silica, have been shown to be effective additives to propellants for reducing gun barrel wear. These additives have been shown to deposit on the walls of the barrel after firing, creating a coating that is more resistant to chemical attack, oxidation, and wear. Boron nitride is of particular interest because of its oxidation resistance. Hexagonal boron nitride has the same structure as graphite and is an excellent lubricant, but unlike graphite, boron nitride does not readily oxidize in air. Further, boron-doping of steel can improve its hardness. However, scalable and economical production of boron nitride nanoparticles with a narrow distribution of small diameters necessary to be effective additives (less than approximately 200 nm) has yet to be realized. Typical approaches for producing nano-BN involve beginning with larger particles and milling them to smaller sizes. The resulting product typically cannot be dispersed without agglomerations, does not have a narrow distribution of small particles, and it is often oxidized as a result of the milling process.

SUMMARY OF THE INVENTION

The disclosed invention relates to methods to for making boron nitride (BN) based nanoparticles and use of these novel materials in dispersions, composites and coatings. Specifically, we disclose several methods for producing nanoparticles that contain boron and nitrogen in about a 1:1 ratio. These particles can contain hydrogen, in ratios up to 6 moles of hydrogen per mole of B and N. Such nanoparticles include materials, such as boron nitride, polyiminoborane, and ammonia borane, among others. The materials are denoted as BNHx, where x is zero or between 0 and 6. Upon heat-treatment these BNHx nanoparticles can decompose to form hexagonal boron nitride. Further heat-treatment and pressurization can be used to form cubic boron nitride. Further, these BNHx materials can be dispersed and deposited on a surface to form a BN-based coating. The materials can also be dispersed and used in composites. Although these precursors have varying thermal stability, at elevated temperatures (100-1100° C.), they begin to decompose to form hexagonal BN. Consequently, these materials can serve as precursors for forming hexagonal BN coatings or dispersions. The BNHx and BN nanoparticles could be used for numerous applications, including protective and lubricative coatings, polymer composites, neutron detector materials, and ceramic composites. One particularly useful application is for propellant composites. The BNHx nano-materials can be easily dispersed in propellants for gun ammunition. When the gun is fired a portion of the BNHx nano-material decomposes to form hexagonal BN that coats the wall of the gun barrel, protecting it and extending its lifetime. The details of the propellant application and methods for producing these nano-materials are described below. In propellant applications, a portion of the BNHx additive may oxidize, thus improving the energetics of the propellant. A portion of the boron may also result in doping of the steel with boron, thus improving its hardness. Boron and nitrogen doping of the steel could also reduce barrel wear by preventing formation of iron carbides that have a lower melting point.

BRIEF DESCRIPTION OF THE ILLUSTRATIONS

Without limiting the scope of the as disclosed herein and referring now to the drawings and figures.

These illustrations are provided to assist in the understanding of the exemplary embodiments of the method of forming boron nitride nanoparticles and materials therefrom as described in more detail below and should not be construed as unduly limiting the specification. In particular, the relative spacing, positioning, sizing and dimensions of the various elements illustrated in the drawings may not be drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

Ammonia borane is an interesting material because it is inexpensive to produce, it has solubility in common solvents, and it decomposes to form BN at elevated temperatures (above 130° C.). To produce ammonia borane, an established method can be used where ammonium carbonate may be reacted with sodium borohydride in tetrahydrofuran (THF) solution to produce sodium bicarbonate, hydrogen, and ammonia borane (see Reaction 1 below). The product may then be dried, and the sodium bicarbonate is washed away using water.

$$NH_4CO_3 + NaBH_4 \rightarrow NaCO_3 + H_2 + H_3BNH_3$$

Reaction 1

Ammonia Borane Synthesis

In processes used to produce ammonia borane, such as the one shown above, it is also possible to intentionally or unintentionally produce byproducts that include polymeric BNHx molecules, such as polyaminoborane and polyiminoborane, and cyclic BNHx molecules, such as cycloborazanes and borazine molecules. These alternative BNHx precursors can also be used to produce BNHy nanoparticles, where y is less than x. One skilled in the art will understand that compounds or nanoparticles denominated BN, boron nitride, or boronitride may still comprise some amount of hydrogen. In an example of BNHy nanoparticle preparation, amorphous BNHy nanoparticles with lower hydrogen content than the precursor BNHx may be produced by chemical vapor deposition of gaseous BNHx produced from ammonia borane (or other BNHx precursors and mixtures thereof) decomposition. During decomposition at elevated temperatures (30° C. to 300° C.) in an inert environment, a portion of the BNHx precursor decomposes to form gaseous BNHx molecules and hydrogen. The gaseous BNHx may be carried to a high temperature furnace, where it may react, at temperatures from 250° C. to 1700° C. to form solid BNHy nanoparticles that are analogous to carbon soot. Depending on processing temperatures, the boron nitride nanoparticles may include amorphous forms, crystalline forms, or combinations thereof. An exemplary reaction is shown below.

$$BNHx_{(g)} \rightarrow BNH_{y(s)} + \tfrac{1}{2}(x-y)H_2$$

Reaction 2

Boron Nitride Synthesis

By means of example, a method or preparing these materials may utilize nitrogen (or another inert gas) carrier which may be fed to a furnace using a rotameter. The carrier may flow through a feed source chamber, which may be charged with ammonia borane or alternative BNHx precursor prior to starting the run. The feed source temperature is controlled by a separate temperature controller. During the process, the feed source area may be heated from less than 100° C. up to 1100° C. to decompose the ammonia borane (or other BNHx) precursor, and release gaseous BNHx. The carrier and BNHx gas may then travel through the furnace hot zone, controlled at a temperature between 250° C. and 1700° C., then passed through a filter trap to elevate the system pressure slightly, and to capture any entrained particles. One could also envision a continuous process, where multiple feed chambers are utilized, and one feed chamber is recharged while the other(s) are in use.

What is claimed, then, as seen in FIGS. 1-11, is a series of embodiments of methods of forming boron nitride nanoparticles, and products therefrom, all by way of example and not limitation only. In one embodiment, the method of forming boron nitride nanoparticles may include a step of volatilizing a plurality of precursor molecules comprising boron, nitrogen and hydrogen in a first heating zone having a first predetermined temperature, thereby forming a plurality of gaseous molecules that contain bonded boron and nitrogen. The method may continue with carrying the gaseous molecules containing bonded boron and nitrogen to a second heating zone having a second predetermined temperature, thereby causing the molecules to react and nucleate to form a plurality of solid boron nitride nanoparticles containing boron and nitrogen. Following such reaction, the boron nitride particles may be collected by suitable means, as would be known to one skilled in the art.

In such an embodiment, the step of volatilizing a plurality of precursor molecules comprises may include the step of decomposing the plurality of precursor molecules. In addition, in such, and other, embodiments, the plurality of precursor molecules may be selected from the ammonia borane, borazine, cycloborazanes, polyaminoborane, polyiminoborane, and mixtures thereof.

In another method, seen in schematic illustrations in FIGS. 1-5, the method may begin with placing a predetermined quantity of a precursor (200), which in some embodiments may be ammonia borane, in a furnace (100) having a gas ingress port (101), a gas egress port (102), and an internal atmosphere (105). The furnace (100) may additionally have at least a proximal section (110) heated by a proximal section heating means (120) forming a first heating zone capable of reaching a first heating zone temperature and at least a distal section (130) having a distal section heating means (140) forming a second heating zone capable of reaching a second heating zone temperature.

The method may continue with forming a non-oxidizing internal atmosphere, which in some embodiments may include purging the furnace internal atmosphere (105) with an inert gas, which may be partially or fully composed of nitrogen. In other embodiments, forming a non-oxidizing internal atmosphere 105) may include at least partially evacuating the furnace (100). The method may proceed to heating the first heating zone to the first heating zone temperature thereby releasing a plurality of hydrogen and other gaseous molecules containing boron and nitrogen into the furnace internal atmosphere (105) from the precursor, which in some embodiments may include ammonia borane, as well as heating the second heating zone to the second heating zone temperature, wherein the second heating zone temperature is greater than the first heating zone temperature.

Next, the method may include directing an inert gas flow from the gas ingress port (101) through the proximal section (110) toward the gas egress port (102) in the distal section (130), thereby flowing the gaseous boron nitride particles from the furnace proximal section (110) into the furnace distal section (130).

The method may involve heating the gaseous boron nitride particles to the second heating zone temperature, thereby forming a plurality of boron nitride nanoparticles (300), which may be transported from the distal section (130); and then recovered by a collecting means (400).

Figure 1:
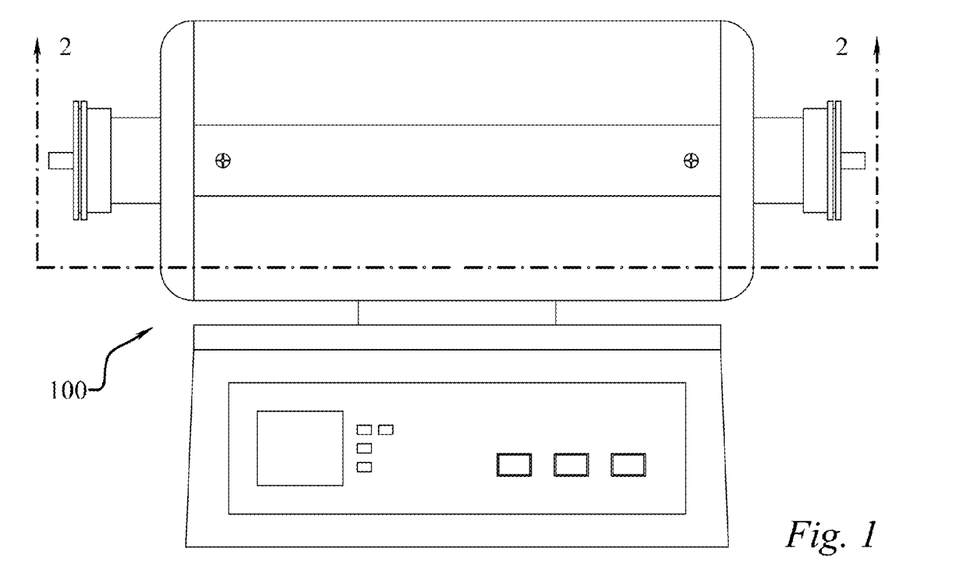
FIG. 1 is a front elevation view of an embodiment of an apparatus for the practice of the disclosed method.
Figure 2:
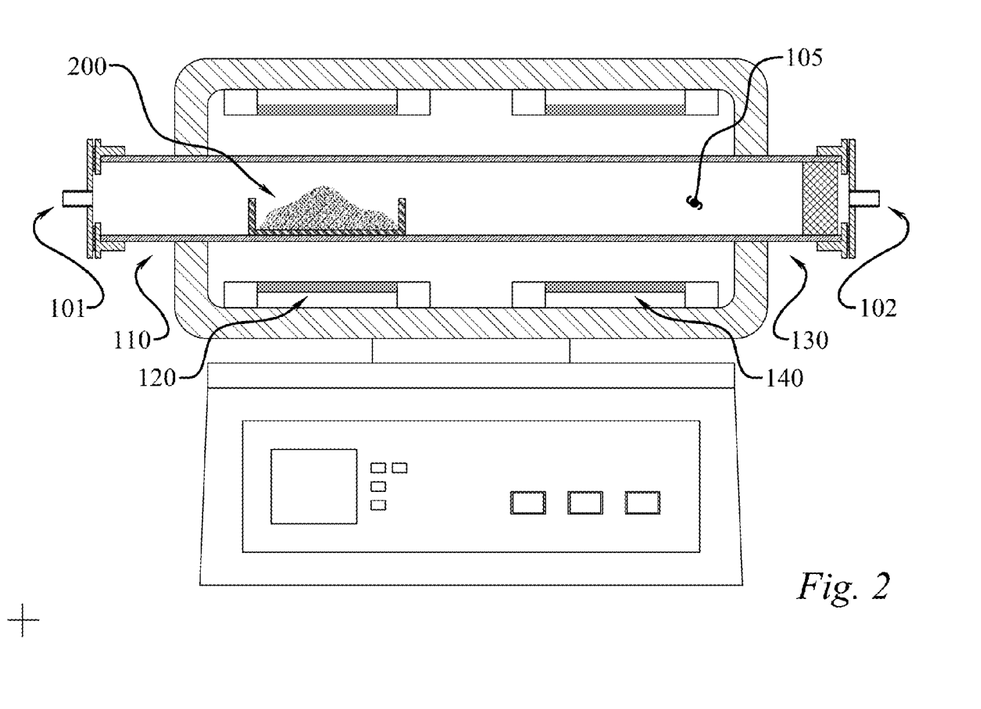
FIG. 2 is a front section view of the apparatus of FIG. 1, taken along line 2-2, illustrating a step in the practice of the method.
Figure 3:
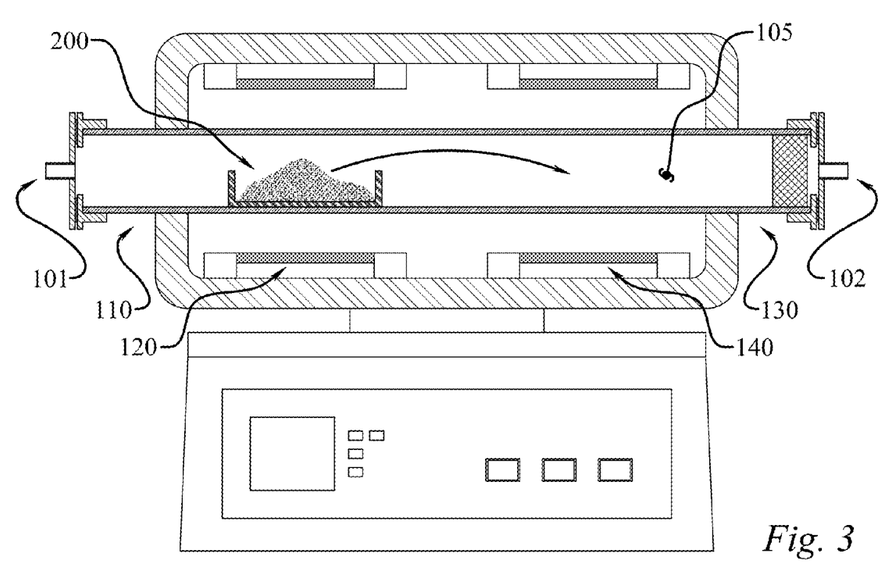
FIG. 3 is a front section view of the apparatus of FIG. 1, taken along line 2-2, illustrating a step in the practice of the method.
Figure 4:
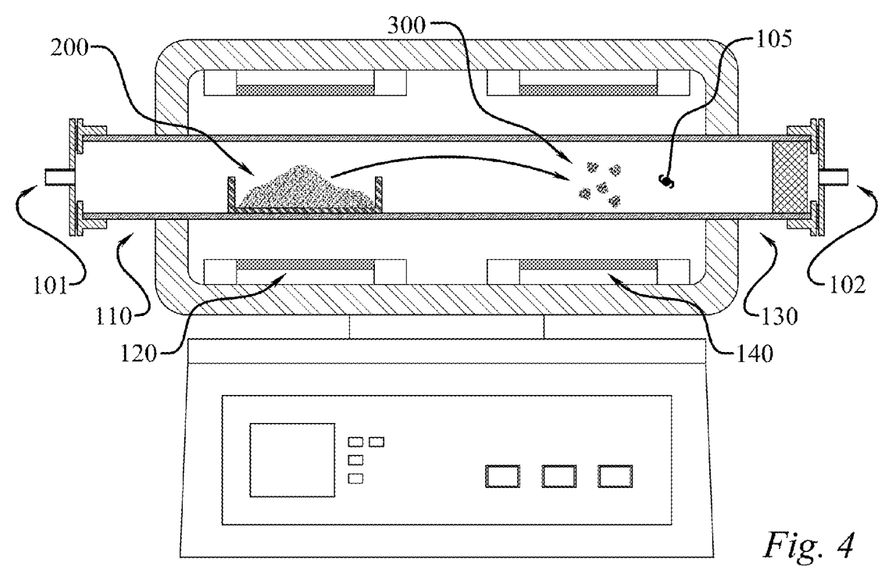
FIG. 4 is a front section view of the apparatus of FIG. 1, taken along line 2-2, illustrating a step in the practice of the method.
Figure 5:
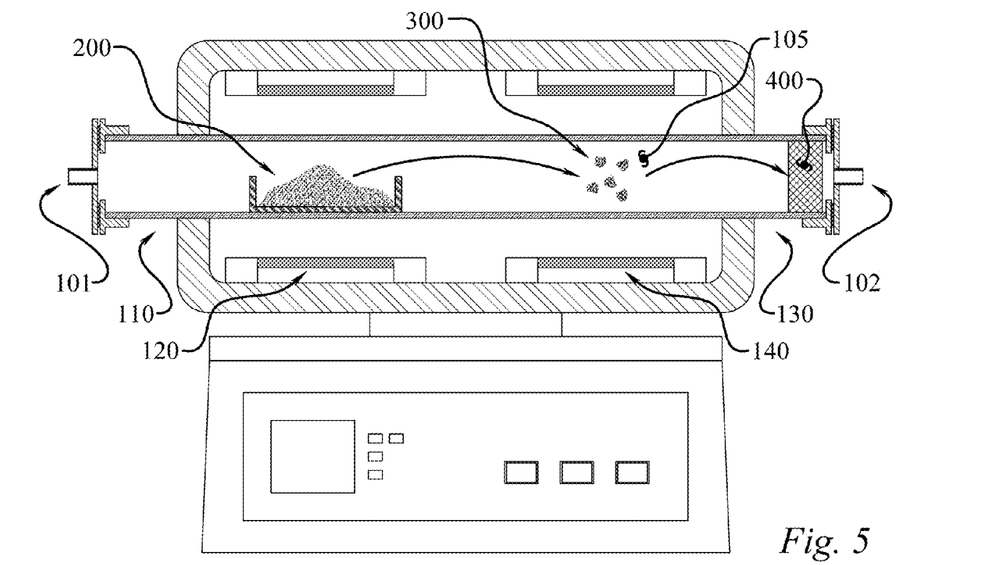
FIG. 5 is a front section view of the apparatus of FIG. 1, taken along line 2-2, illustrating a step in the practice of the method.
Figure 6:
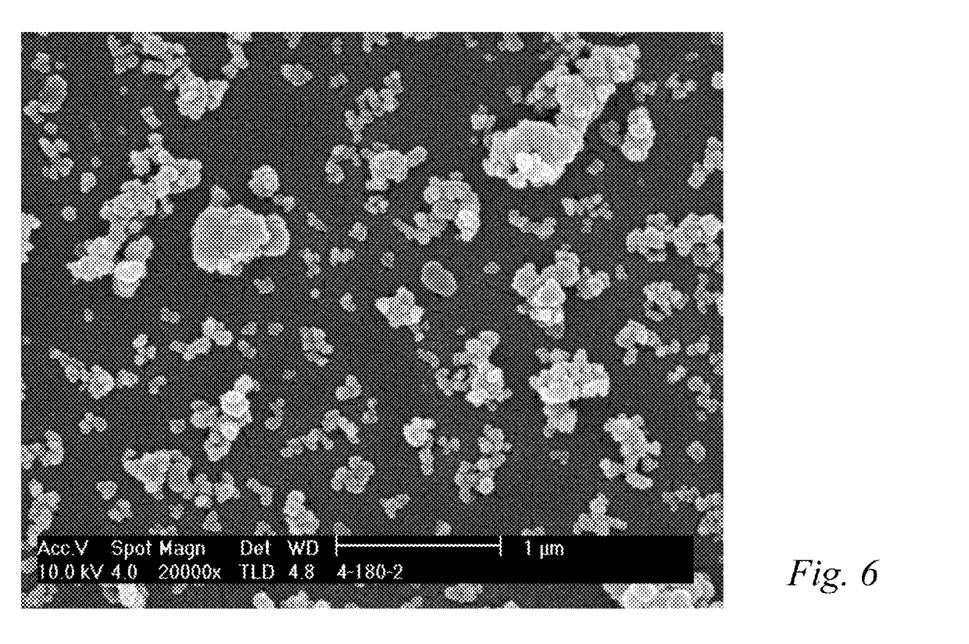
FIG. 6 is an SEM micrograph showing amorphous boron nitride nanoparticles produced by the disclosed process and deposited on a gold-coated glass slide.
Figure 7:
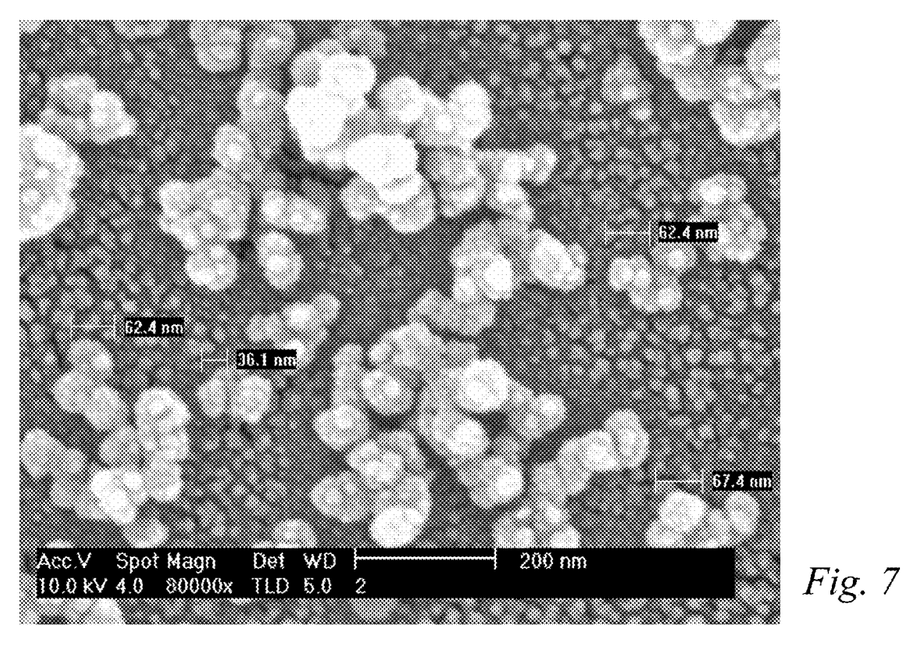
FIG. 7 is a further SEM micrograph showing amorphous boron nitride nanoparticles produced by the disclosed process and deposited on a gold-coated glass slide.
Figure 8:
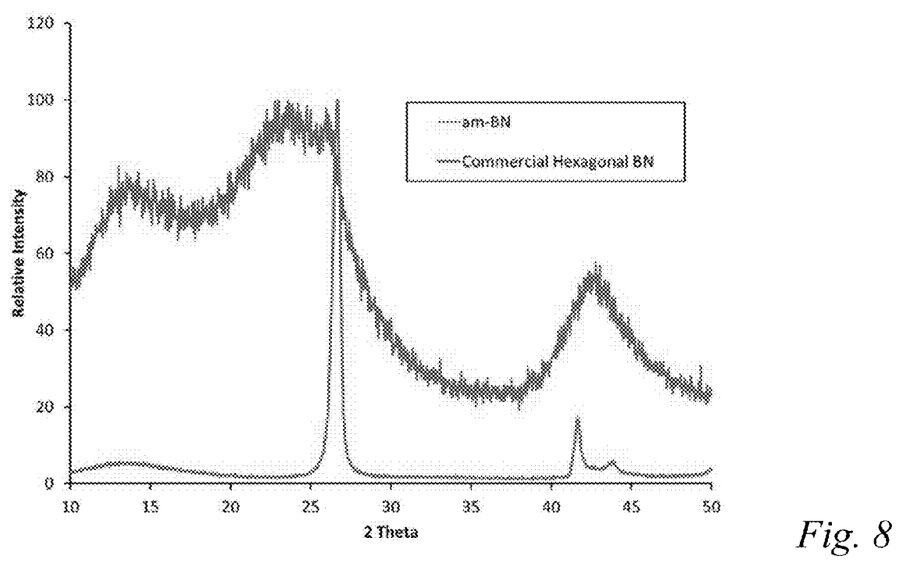
FIG. 8 is an XRD pattern for amorphous BN nanoparticles produced through gas-phase pyrolysis of ammonia borane at 1000° C. compared to commercial hexagonal boron nitride.
Figure 9:
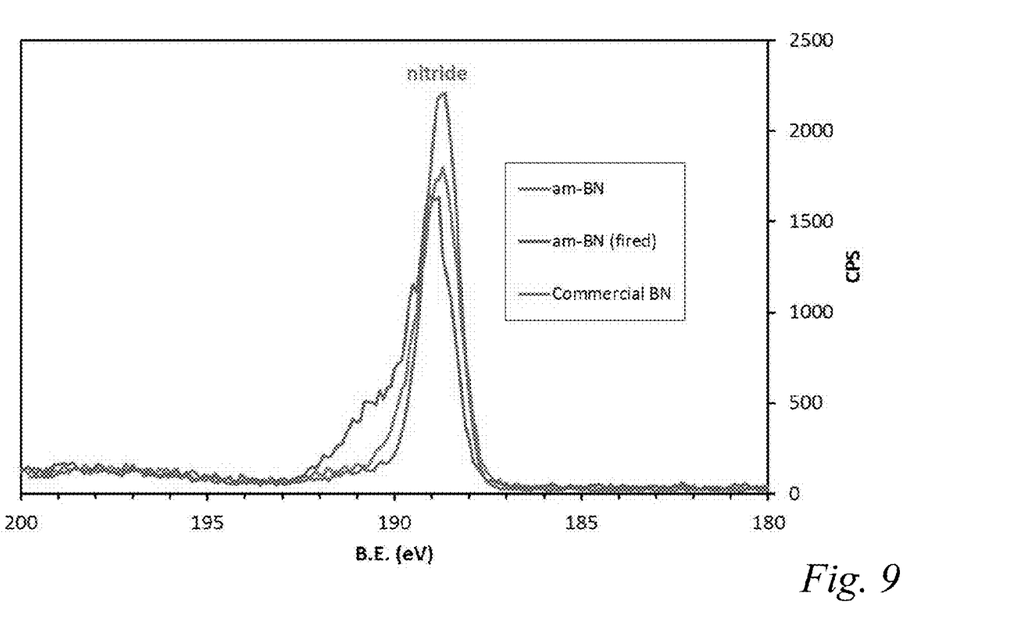
FIG. 9 is an XPS analysis showing the B1s region for amorphous BN nanoparticles compared to commercial BN.
Figure 10:
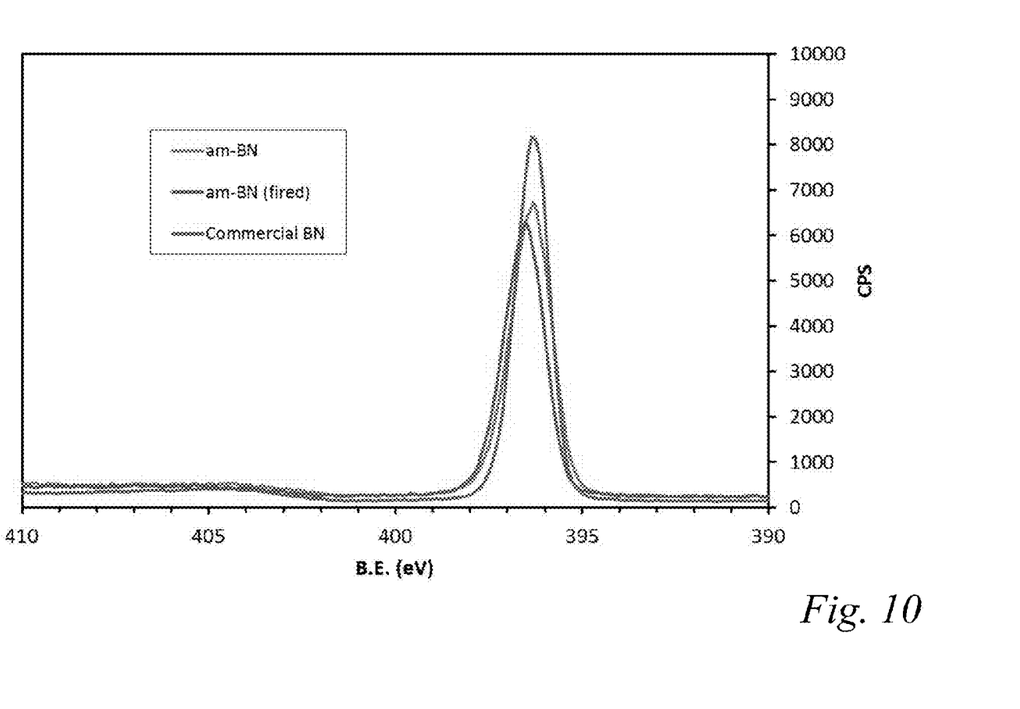
FIG. 10 is an XPS analysis showing the N1s region for amorphous BN nanoparticles compared to commercial BN.

FIGS. 6 and 7 show SEM micrographs of amorphous boron nitride particles, in embodiments according to this method. FIGS. 8, 9 and 10 show XRD patterns and XPS analyses, respectively, comparing amorphous boron nitride nanoparticles compared to commercial hexagonal boron nitride.

Numerous additional embodiments are envisioned, and in one, the inert gas further includes nitrogen; and in another, the inert gas further consists exclusively of nitrogen. In other variations of the method, the step of heating the first heating zone to the first heating zone temperature may occur at a rate increase of approximately 5° centigrade per minute. Additionally, in some embodiments, the step of heating the first heating zone to the first heating zone temperature may include heating the first heating zone to the first heating zone temperature that is at least 100° centigrade and less than 600° centigrade, while in other embodiments, the step of heating the first heating zone to the first heating zone temperature includes heating the first heating zone to the first heating zone temperature that is approximately 230° centigrade.

In certain embodiments, the step of heating the second heating zone to a second heating zone temperature may include heating the second heating zone to a second heating zone temperature that is at least 600° centigrade, while in still other embodiments, the step of heating the second heating zone to a second heating zone temperature may include heating the second heating zone to a second heating zone temperature that is approximately 1200° centigrade.

In terms of transporting the boron nitride nanoparticles, in some embodiments, the step of transporting the boron nitride nanoparticles may utilize an inert gas flow from the gas ingress port (101) in the proximal section (110) toward the gas egress port (102) in the distal section (130) that further involves directing the inert gas flow at a rate of approximately 200 cc/min at 1 atm. In other embodiments, the process may be run in at least a partial vacuum.

Various means may be employed to recover the product. In some embodiments, the step of recovering the boron nitride nanoparticles further includes trapping the boron nanoparticles in a collecting means (400), and in some embodiments, the collecting means (400) may be a filter trap.

In an alternate embodiment, the boron nitride nanoparticles can be produced continuously within a single reactor system. In summary, such a method may begin with providing a furnace (100) with a precursor supply means system (not shown) in communication with a furnace internal atmosphere (105). The furnace (100) may have a proximal section (110) having a gas ingress port (101) heated by a proximal section heating means forming a first heating zone capable of reaching a first heating zone temperature. Such a proximal section (110) may be in at least intermittent fluid communication with a distal section (130) having a gas egress port (102), and which may have a distal section heating means forming a second heating zone capable of reaching a second heating zone temperature.

The method may continue with forming a non-oxidizing internal atmosphere, which in some embodiments may include purging the furnace internal atmosphere with an inert gas, which in some embodiments may be partially or fully composed of nitrogen, and in other embodiments, may be an inert gas other than nitrogen, or a mixture of gases other than nitrogen. In other embodiments, forming a non-oxidizing internal atmosphere may include at least partially evacuating the furnace. Next the first heating zone may be heated to the first heating zone temperature and the second heating zone may be heated to the second heating zone temperature, and the second heating zone temperature would be greater than the first heating zone temperature.

Such a continuous process may proceed with continuously introducing a predetermined amount of precursor from the precursor supply means into the first heating zone, thereby releasing a plurality of hydrogen and other gaseous molecules containing boron and nitrogen into the furnace internal atmosphere (105) from the precursor.

The method may proceed by continuously directing an inert gas flow from the gas ingress port (101) through the proximal section (110) toward the gas egress port (102) in the distal section (130), thereby flowing the gaseous molecules containing boron and nitrogen from the first heating zone into the second heating zone. There, the gaseous molecules containing boron and nitrogen may be heated to the second heating zone temperature, thereby forming a plurality of boron nitride nanoparticles. The boron nitride nanoparticles may be transported from the distal section (130); and the boron nitride nanoparticles may be recovered.

Further variations and embodiments may include allowing at least a portion of the precursor to remain as an unconsumed precursor in the proximal section (110), along with the step of at least intermittently removing the unconsumed precursor from the first heating zone. In some embodiments, the precursor supply means system (not shown) may be a piston system, a conveyor belt system, a pump system, an auger system, or some other means or combination as would be known to one skilled in the art.

In various embodiments, the precursor may be selected from ammonia borane, cycloborazanes, polyaminoborane, polyiminoborane, other compounds that produce gaseous BNHx, and mixtures thereof. The method may produce boron nitride nanoparticles having a largest diameter of less than 1 micron and more than 200 nm. In some preferred embodiments, particle sizes having largest diameters of between about 30 and 70 nm may be produced. In certain embodiments, even smaller particle sizes may be achievable.

To recapitulate in other terms, in such continuous embodiments, the system may include two heated zones, both under non-oxidizing environments, each heated to a different temperature. The first zone, which may for purposes of illustration be called the pre-heat zone, may be heated to approximately between 30° and 600° C., and in a preferred embodiment, preferably 230° C. The second zone is at a higher temperature than the pre-heat zone. The second zone, which may for purposes of illustration be called the hot zone, may be heated to between 300° and 1700° C., and in one embodiment, to approximately 1100° C. The pre-heat zone is connected to the hot zone by a gas flow passage. The hot zone contains a gas exit passage that is connected to a device for recovering entrained nanoparticles, such as a filter trap.

A precursor that can be volatilized or decomposed to form gaseous BNHx compounds is fed to the pre-heat zone by a mechanical means, such as a piston, conveyor belt, pump, or auger, while maintaining a non-oxidizing atmosphere. That precursor could include ammonia borane, cycloborazanes, polyaminoborane, polyiminoborane, other compounds that produce gaseous BNHx, and mixtures thereof. Any portion of the precursor that does not volatilize or decompose may be subsequently removed from the pre-heat zone using suitable means, including mechanical means. The gaseous BNHx compound(s) produced from the precursor may travel to the hot zone where they nucleate to form solid boron nitride nanoparticles and hydrogen. The hot zone volume, temperature, and gas flow rate are properly designed to produce a product with high selectivity to nanoparticles less than 1 micron in their largest diameter, and preferably less than 200 nm. In some embodiments, even small diameters may be achieved. A majority of the nanoparticles flow out the hot zone and can be recovered. Some of the product may coat the walls of the hot zone exit. The product can be mechanically removed by a number of means, including periodic bursts of gas flow, or a piston.

In one embodiment, ammonia borane is fed to a pre-heat zone at a rate of 1 gram per minute using a piston and the pre-heat zone is maintained at a temperature of approximately 230° C. Any portion of the ammonia borane that does not volatilize may be removed from the pre-heat zone using a piston or other mechanical means. Inert carrier gas, which in some embodiments may be nitrogen, is flowed at a rate of 1.5 slpm, through the pre-heat and into the hot zone, which is maintained at a temperature of approximately 1100° C. In one embodiment, the hot zone includes a portion of a 50 cm long, 12 cm diameter alumina tube furnace. Boron nitride product deposits on the furnace walls at the exit of the hot zone and in a filter trap downstream of the reactor. Periodically, boron nitride nanoparticles are mechanically removed from the exhaust tube and filter trap.

In other embodiments, the particles may then be formulated as part of a method to form a dispersion and even as a composite. A method of forming a boron nitride nanoparticle dispersion may begin with the step of providing a predetermined quantity of boron nitride nanoparticles; followed by mixing the boron nitride nanoparticles with a liquid to form a dispersion. Physical dispersion may be aided by agitating the dispersion for a predetermined amount of time. A dispersant may be included in the dispersion, as may be a binder.

Figure 11:
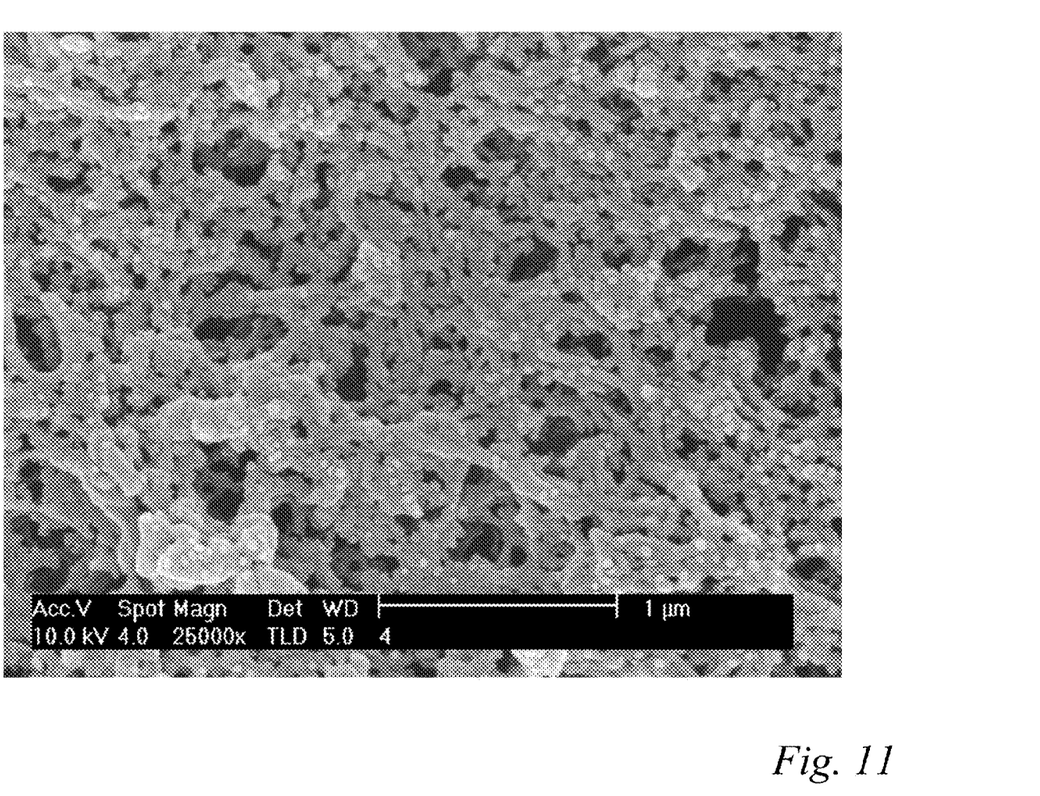
FIG. 11 is a SEM image of ~50-wt % amorphous BN nanoparticles (lighter colored spheres) dispersed in a polymeric matric of solid commercial double base propellant.

A method of forming a boron nitride solid composite may include providing a predetermined quantity of boron nitride nanoparticle dispersion in a liquid. This may be mixed with a certain quantity of a compositing material, and the dispersion allowed to fully permeate the compositing material. Finally, one may remove at least a portion of the liquid to form a composite that may range from liquid to semi-liquid, to semi-solid, to solid. In different embodiments, the compositing material may be a soluble material, and may be a polymer. In other embodiments, particularly those that may be used for coating gun barrels, by way of example only and not limitation, the compositing material may be nitro-cellulose, and the composite may further be formulated as part of a propellant, which may or may not include a plasticizer. FIG. 11 is a SEM image of ~50-wt % amorphous BN nanoparticles (lighter colored spheres) dispersed in a polymeric matric of solid commercial double base propellant.

In other terms, in one embodiment of the invention, the boron nitride nanoparticles may be dispersed in a liquid. The spherical nature of the nanoparticles allows them to be easily dispersed, unlike hexagonal boron nitride or boron nitride nano-tubes. To prepare a liquid dispersion, in one embodiment the boron nitride nanoparticles are mixed with a liquid, such as water, acetone, ethanol, or iso-propyl alcohol. The weight fraction of boron nitride can range from one part per million to 90%. The dispersion may be mixed using an agitation means, such as mechanical mixing or ultra-sonication. A dispersant, such as ECOSURF SA-9 from Dow Chemical, may also be added to the dispersion to inhibit the particles from settling.

In one embodiment of a boron nitride nanoparticle dispersion, 2-wt % nanoparticle boron nitride is added to a 1:1 by mass mixture of ethanol and acetone. The mixture is mechanically stirred for 20 minutes, and then sonicated for 5 minutes. The dispersion is ready for use at this point. If the dispersion is allowed to sit for several minutes, then the mixing can be repeated before the dispersion is used again.

In another embodiment of the invention, a composite material can be produced from the boron nitride nanoparticle dispersion disclosed above. In this embodiment, the dispersion may be mixed with either a soluble material, another particulate material, or a porous material that allows the liquid and nanoparticles to permeate throughout the material. The liquid is then dried, thus leaving behind well-dispersed boron nitride nanoparticles throughout the material. Such a dispersion could be useful for preparing composites of boron nitride in polymers, metals, or ceramics. Such a composite could add advantageous properties to the new material, such as oxidation resistance, lubricity, and as a precursor to boron doping, neutron shielding, or neutron detection. The boron nitride could also be mixed with larger boron nitride nanoparticles. Such a composite could be useful in processing boron nitride shapes and products.

In another embodiment, a polymer composite is prepared using the boron nitride dispersion. First, 100 mg of nitro-cellulose is dispersed in 60 grams of 1:1 ethanol:acetone by stirring for 18 hours, followed by 30 minutes of ultra-sonication. Next, 100 mg of BN nanoparticles are added to 12 grams of 1:1 ethanol:acetone, and sonicated 20 minutes. Then, the nitro-cellulose dispersion and BN nanoparticle mixture are mixed together and sonicated for one additional minute. Finally, the liquid is evaporated under ambient conditions, leaving behind boron nitride nanoparticles dispersed throughout the nitro-cellulose matrix. As can be seen in FIG. 11, the BN nanoparticles (small brighter spheres) are well dispersed throughout the polymer.

In another preferred embodiment, a composite propellant is prepared from the boron nitride dispersion. Nitrocellulose and 25% ethanol by weight are added to a sigma blade mixer, and mixed for 1 hour. Next, a dispersion of 1 part by mass of BN nanoparticles in 50 parts by mass of 1:1 ethanol:acetone is added to the mixer. Optionally, plasticizer may also be added in this step. Next, the materials are mixed for 3 hours at 50° C. with the sigma blade mixer. Then the composite is vacuum dried to 15-20 wt % solvent. Next, the composite is pushed through a screen to remove contaminants. Finally, the composite is extruded into desirable shapes, such as cylinders, and dried 3 days in an oven at 50-60° C.

In still other embodiments of the invention, the boron nitride nanoparticle dispersion can be used as a precursor to forming boron nitride coatings of surfaces. Similar to the composites, coatings of boron nitride could be useful for a number of materials, including polymers, metals, or ceramics. Such a coating could add advantageous properties, such as oxidation resistance, lubricity, and act as a precursor to boron doping, neutron shielding, or neutron detection. To prepare a coating, the dispersion is applied to a surface and allowed to dry, leaving behind a thin coating of boron nitride nanoparticles.

In one embodiment of a coating, the boron nitride dispersion is used to coat a stainless steel surface. To form a BN coating on a surface, a BN dispersion may be prepared, as described above. The dispersion is then sprayed onto the surface using a common aerosol spray approach. Other methods of coatings could include screen printing or painting. The coating is then dried at ambient temperature. Coating adhesion can be improved through heat treatment of the surface at 600° C. for 1 hour in nitrogen. Binders can also be applied to the surface prior to deposition of the dispersion in order to improve adhesion.

EXAMPLE 1

In one example experimental procedure, gaseous BNHx material was produced from ammonia borane through heat-mediated decomposition at 100° C. to approximately 225° C., with a 50° C./min heating rate, and the resultant gaseous matter was carried to a heat zone at 1000° C. using a nitrogen carrier gas. The BNHy solid product deposited in the exhaust line as a white powdery residue. The material was then dispersed in isopropyl alcohol and deposited on gold-coated slides for SEM analysis. Based on the SEM images in FIGS. 6 and 7, the product consisted of spherical sub-micron particles. TEM with EELS analysis confirmed that this product has a B:N ratio of about 1:1 (data not shown). The product nanoparticles were analyzed by x-ray diffraction to determine their crystal structure. As seen in FIG. 8, the product lacked a strong diffraction pattern relative to commercial hexagonal boron nitride, indicating the product material is amorphous. As noted, had higher temperatures been applied, one skilled in the art would appreciate that at least some crystalline forms might have been produced. The material was further characterized by x-ray photo-electron spectroscopy (XPS). XPS data, shown in FIGS. 9 and 10, confirmed that the product material has boron and nitrogen with the same oxidation state as boron nitride. XPS also confirmed that the ratio of boron and nitrogen in the product materials is approximately 1:1. The product material was then fired in air at 1000° C. for over one hour. Under these conditions, ammonia borane (and similar more reactive BNHx molecules) would be completely oxidized. As shown in the XPS data, FIGS. 9 and 10, the fired product material is not significantly more oxidized and maintains a 1:1 B:N ratio. This result demonstrates the product material has better stability and resistance to oxidation than the precursor material used to produce the product material.

EXAMPLE 2

The product from a second run at 800° C. in the hot zone was also prepared. For this sample, 0.800 g of ammonia borane was loaded in a chamber. The chamber was heated from room temperature to 225° C. at 5° C./min under nitrogen flow at 200 cc/min at 1 atm. The gas then passed directly to the 800° C. hot zone. After the run, the sample was collected from the exhaust line and imaged using SEM. This product was noticeably stickier than the powdery "soot-like" product formed in higher temperature run. The product appeared to be soluble in isopropyl alcohol, and formed crystal deposits on the glass substrate as the alcohol was evaporated. It is hypothesized that the product is the BNHy analogy to hydrocarbon tar, which forms during decomposition of hydrocarbons at lower temperatures than soot formation.

Numerous alterations, modifications, and variations of the preferred embodiments disclosed herein will be apparent to those skilled in the art and they are all anticipated and contemplated to be within the spirit and scope of the disclosed specification. For example, although specific embodiments have been described in detail, those with skill in the art will understand that the preceding embodiments and variations can be modified to incorporate various types of substitute and or additional or alternative materials, relative arrangement of elements, order of steps and additional steps, and dimensional configurations. Accordingly, even though only few variations of the method and products are described herein, it is to be understood that the practice of such additional modifications and variations and the equivalents thereof, are within the spirit and scope of the method and products as defined in the following claims. The corresponding structures, materials, acts, and equivalents of all means or step plus function elements in the claims below are intended to include any structure, material, or acts for performing the functions in combination with other claimed elements as specifically claimed.

We claim:

1. A method of forming boron nitride nanoparticles, comprising the steps of:
   a) volatilizing a plurality of first precursor molecules comprising boron, nitrogen and hydrogen in a first heating zone having a first predetermined temperature to form a plurality of gaseous second precursor molecules that comprise bonded substantially unoxidized boron and nitrogen;
   b) directly carrying the gaseous second precursor molecules comprising bonded substantially unoxidized boron and nitrogen entrained in a gas flow to a second heating zone having a second predetermined temperature thereby causing the molecules to react and nucleate to form a plurality of solid boron nitride nanoparticles while entrained in the gas flow, comprising substantially unoxidized boron and nitrogen; and
   c) collecting the boron nitride nanoparticles.

2. The method according to claim 1, wherein the step of volatilizing a plurality of precursor molecules comprises decomposing the plurality of precursor molecules.

3. The method according to claim 1 where the plurality of precursor molecules are selected from the group of precursor molecules consisting of ammonia borane, borazine, cyclo­borazanes, polyaminoborane, polyiminoborane, and mixtures thereof.

4. A method of forming boron nitride nanoparticles, comprising the steps of:
   a) placing a predetermined quantity of ammonia borane in a furnace having a gas ingress port, a gas egress port, an internal atmosphere and at least a proximal section heated by a proximal section heating means forming a first heating zone capable of reaching a first heating zone temperature and at least a distal section heated by a distal section heating means forming a second heating zone capable of reaching a second heating zone temperature;
   b) creating a non-oxidizing internal atmosphere;
   c) heating the first heating zone to the first heating zone temperature thereby releasing a plurality of hydrogen and other gaseous molecules containing boron and nitrogen into the furnace internal atmosphere from the ammonia borane and heating the second heating zone to the second heating zone temperature, wherein the second heating zone temperature is greater than the first heating zone temperature;

d) directing an inert gas flow from the gas ingress port through the proximal section toward the gas egress port in the distal section, thereby flowing the gaseous boron nitride particles from the furnace proximal section into the furnace distal section;

e) heating the gaseous boron nitride particles to the second heating zone temperature, thereby forming a plurality of boron nitride nanoparticles;

f) transporting the boron nitride nanoparticles from the distal section; and g) recovering the boron nitride nanoparticles.

5. The method according to claim 4, wherein the step of creating a non-oxidizing internal atmosphere comprises purging the furnace with an inert gas.

6. The method according to claim 4, wherein the step of creating a non-oxidizing internal atmosphere comprises partially evacuating the furnace.

7. A method of continuously forming boron nitride nanoparticles, comprising the steps of:

a) providing a furnace with a precursor supply means system in communication with a furnace internal atmosphere; wherein the furnace has at least a proximal section having a gas ingress port, and heated by a proximal section heating means forming a first heating zone capable of reaching a first heating zone temperature, in at least intermittent fluid communication with at least a distal section having a gas egress port, and heated by a distal section heating means forming a second heating zone capable of reaching a second heating zone temperature;

b) creating a non-oxidizing internal atmosphere;

c) heating the first heating zone to the first heating zone temperature and heating the second heating zone to the second heating zone temperature, wherein the second heating zone temperature is greater than the first heating zone temperature;

d) continuously introducing a predetermined amount of a precursor from the precursor supply means system into the first heating zone, thereby releasing a plurality of hydrogen and other gaseous molecules containing boron and nitrogen into the furnace internal atmosphere from the precursor;

e) continuously directing an inert gas flow from the gas ingress port through the proximal section toward the gas egress port in the distal section, thereby flowing the gaseous molecules containing boron and nitrogen from the first heating zone into the second heating zone;

f) heating the gaseous molecules containing boron and nitrogen to the second heating zone temperature, thereby forming a plurality of boron nitride nanoparticles;

g) transporting the boron nitride nanoparticles from the distal section; and h) recovering the boron nitride nanoparticles.

8. The method according to claim 7, wherein the step of continuously introducing a predetermined amount of a precursor from the precursor supply means system into the first heating zone, thereby releasing a plurality of hydrogen and other gaseous molecules containing boron and nitrogen into the furnace internal atmosphere further comprises the step of allowing at least a portion of the precursor to remain as an unconsumed precursor in the proximal portion, and the step of at least intermittently removing the unconsumed precursor from the first heating zone.

9. The method according to claim 7, wherein the precursor supply means system is selected from the group of supply means systems consisting of a piston system, a conveyor belt system, a pump system and an auger system.

10. The method according to claim 7, wherein the precursor is selected from the group of precursors consisting of ammonia borane, cycloborazanes, polyaminoborane, polyiminoborane, other compounds that produce gaseous $BNH_x$, and mixtures thereof.

11. The method according to claim 7, wherein the boron nitride nanoparticles have a largest diameter of less than 1 micron.

* * * * *